Sept. 27, 1927.  
O. G. SIMMONS  
SPIRAL CUTTER  
Filed March 12, 1924

1,643,474

2 Sheets-Sheet 1

Inventor  
Oliver G. Simmons  
Thurston Kwis & Hudson  
attys

Sept. 27, 1927. 1,643,474
O. G. SIMMONS
SPIRAL CUTTER
Filed March 12, 1924 2 Sheets-Sheet 2
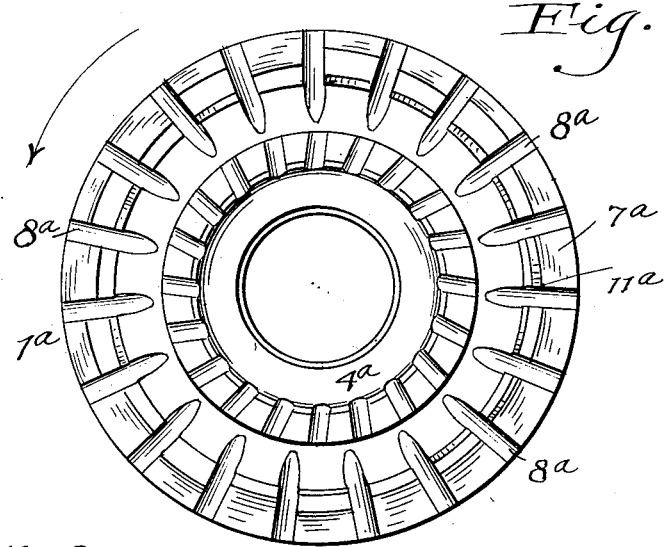
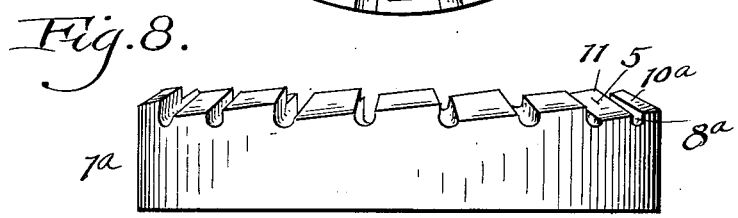
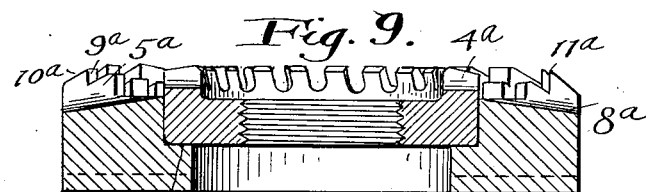
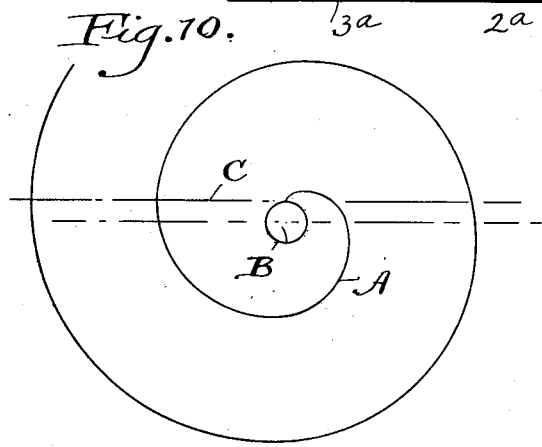
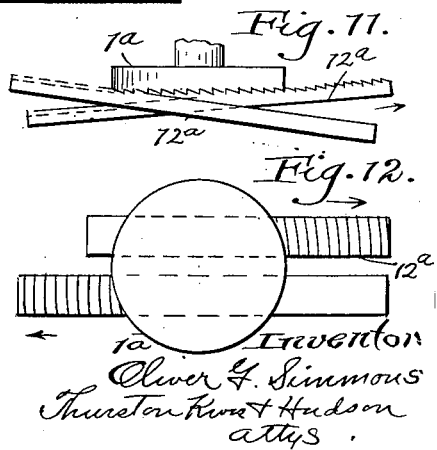

Patented Sept. 27, 1927.

1,643,474

UNITED STATES PATENT OFFICE.

OLIVER G. SIMMONS, OF LAKEWOOD, OHIO.

SPIRAL CUTTER.

Application filed March 12, 1924. Serial No. 698,619.

The present invention relates to improvements in milling cutters of the type having teeth arranged on a spiral curve which extends around the axis of the cutter and which is designed to generate ribs or teeth of a corresponding curvature upon the surface of a blank.

A cutter of the general character above referred to is disclosed in my Patent No. 1,126,107, granted Jan. 26, 1915, designed particularly for the purpose of generating spiral teeth upon a file.

One of the main objects of the present invention is to provide a cutter capable of generating teeth having sharper cutting edges.

A further object is to provide a cutter which will clear itself more readily during the cutting operation and in which the individual teeth of the cutter are subjected to less wear so that the cutter will have a longer life and may be operated for a longer period without regrinding.

The above and other advantages are attained as will be hereinafter more fully explained by so forming the teeth of the cutter that alternate teeth on a given spiral row are staggered with respect to intermediate teeth, this being accomplished by forming an odd number of teeth in the circumference of the cutter and forming successive teeth on adjacent spires of the curve. In operating upon the blank successive teeth circumferentially of the cutter will operate in adjacent grooves on the blank.

A further object of the invention is to provide a cutter in which the teeth are formed upon a curve such that the cutter may operate simultaneously upon a plurality of blanks.

With the above and other objects in view the invention may be said to comprise the structures illustrated in the accompanying drawings hereinafter described and particularly set forth in the appended claims, together with such variations and modifications thereof as will be apparent to those skilled in the art to which the invention appertains.

Figure 1:
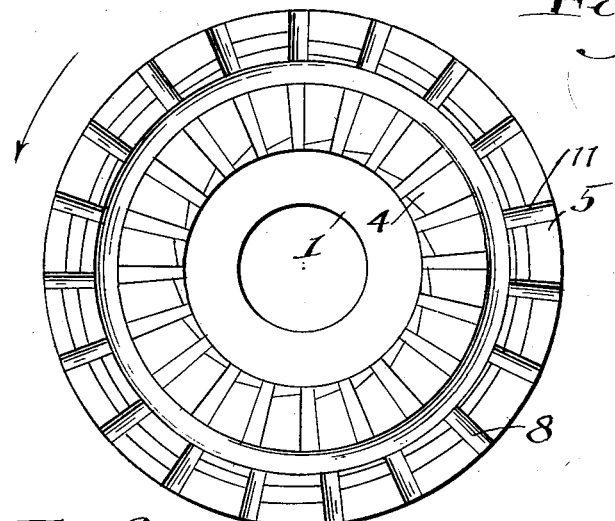
Figure 2:
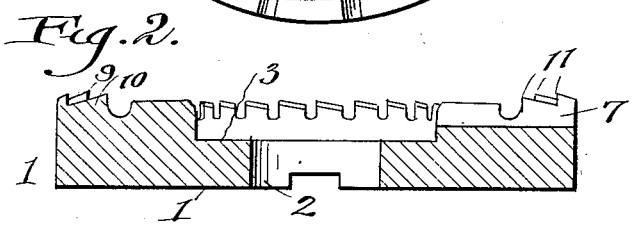
Figure 3:
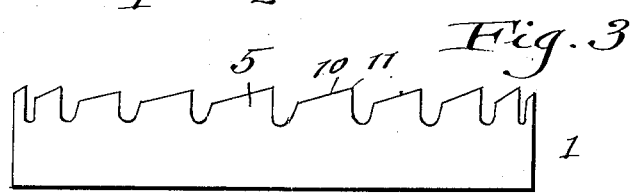
Figure 5:
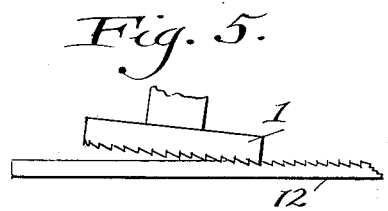
Figure 4:
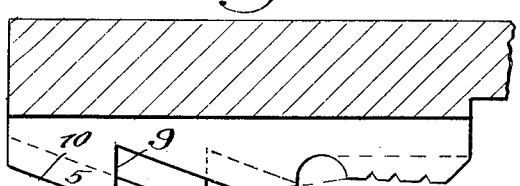
Figure 6:
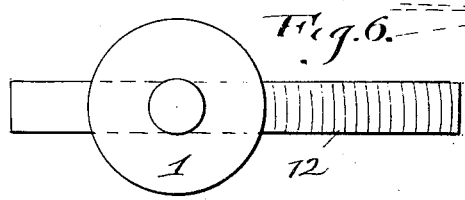

Reference should be had to the accompanying drawings forming a part of this specification in which Fig. 1 is a plan view of a cutter embodying the invention; Fig. 2 is an axial section through the cutter; Fig. 3 is a side elevation of the cutter; Fig. 4 is an enlarged fragmentary section showing the form of the cutting teeth; Fig. 5 and Fig. 6 are diagrammatic views showing in plan and side elevation, a cutter such as illustrated in Figs. 1 to 4 operating upon a file blank: Fig. 7 is a plan view of a modified form of cutter, the teeth of which are arranged upon a different spiral curve and which has certain advantageous characteristics not possessed by the cutter shown in Figs. 1 to 4; Fig. 8 is a side elevation of the cutter shown in Fig. 7; Fig. 9 is an axial section through the cutter shown in Figs. 7 and 8; Fig. 10 is a diagrammatic view showing a curve having the characteristics of the curve upon which the cutter teeth of the cutter shown in Figs. 7 to 9 are generated; Figs. 11 and 12 are diagrammatic views showing in plan and side elevation a cutter such as illustrated in Figs. 7 to 9 operating upon a plurality of file blanks.

Before describing in detail the structure of the cutter it may be well to explain briefly the principle of operation and to make clear the meaning and scope of certain descriptive terms used in the specification.

If a plane surface be given a continuous rotary movement about a given axis and a member having a point contact with the surface be given a continuous movement along a fixed path, i. e. along a straight line or given curve, such that the point in contact with the surface gradually approaches or recedes from the axis of rotation, the curve traced by the point upon the surface will be one of the many curves included in the general class known as spirals. If the surface be a blank and the member having relative linear and rotative movement with respect thereto be a cutter, the cutter will form a groove upon the blank which follows the curve determined by the relative linear and rotative movements. If the groove cut on the blank be of proper cross sectional shape and the resulting ribs be gashed transversely at regular intervals a milling cutter with spirally arranged teeth may be formed and this cutter may be used to generate teeth upon a blank which has a path of movement and a rate of movement corresponding to the linear movement of the cutter by which the cutting teeth of the milling cutter were originally generated. If in generating the spirally arranged teeth upon the milling cutter the rotary and linear movements are both uniform, the spiral curve will have a uniform lead along a line corresponding to that upon which the generating cutter was moved. If the cutter be moved at a uniform rate along a radius of the uniformly rotating blank the curve generated will be the spiral of Archimedes which has a constant lead along a radial line. Such a cutter is illustrated in Figs. 1 to 4 and may be employed as shown diagrammatically in Figs. 5 and 6 to generate spiral teeth in a file blank, the blank being disposed with its longitudinal axis intersecting the axis of the cutter and having a uniform longitudinal movement so correlated to the speed of rotation of the cutter that at the center line of the blank; the cutting teeth have no movement longitudinally of the blank.

If in generating the teeth of the milling cutter the tooth generating cutter be moved over the rotating blank at a uniform rate along a straight line other than a radial line, the curve generated will be one of a general class of spiral curves which includes the involutes of circles, all curves of this class being characterized by the fact that they have a uniform lead along a tangent to the circle in which the curve has its origin. If the lead between spires along the tangent line be equal to the circumference of the circle of origin, in this case the evolute, the curve will be the involute of the circle. As illustrated in Figs. 11 and 12 a cutter such as above described may be employed to generate teeth upon a file blank which is fed longitudinally to the cutter at a uniform speed, the longitudinal axis of the blank in this case being disposed tangent to the circle in which the curve of the cutter teeth has its origin, and the speed of rotation of the cutter and blank being correlated in the same manner as the cutter and blank in generating the teeth on the milling cutter. By reason of the fact that the cutter teeth may be generated on a curve having its origin in a circle of any desired diameter, this cutter has the advantage that it may operate simultaneously upon a plurality of blanks as illustrated in Figs. 11 and 12 and produce teeth of equal curvature the chord of which will preferably be at right angles (90°) to the axis of the file blank.

It is to be understood that the term "spiral" is used herein in its generic sense and not as commonly employed to designate the Archimedean spiral and that the two classes of spiral curves herein specifically mentioned are but illustrations of various spiral curves which may be employed depending on the character of the work for which the cutter is designed. It should also be understood that the face of the cutter blank upon which the spirally disposed teeth are generated need not be flat but may be conical or concave or convex depending upon the character of work for which the cutter is designed.

Referring first to Figs. 1 to 4 and 9 and 10 of the drawing, the cutter body 1 is formed with a central bore 2 for attachment to a driving spindle and with a central counterbore 3 upon its outer side. A suitable roughing cutter 4 is in this instance formed integrally with the cutter body and has a circumferential row of teeth projecting sufficiently therefrom to engage the blank acted upon in advance of the spirally disposed generating teeth 5 which surround the roughing cutter. In forming the cutter a raised peripheral portion is provided upon the face thereof and in this raised portion the spirally arranged teeth 5 are generated in the rotating blank by a cutter which has a uniform movement along a radius of the blank. The raised portion is divided into an odd number of sections 7 of equal size by equally spaced transverse grooves or gashes 8 which may be disposed radially or at a fixed angle with respect to radial lines. The machine which generates the teeth will be provided with suitable indexing mechanism so that it will be caused to skip alternate raised sections 7 of the blank so that in each spire of the curve, cutting teeth will be formed upon alternate raised sections of the blank. By reason of the fact that there are an odd number of raised sections in the blank the cutter will, during the second revolution of the blank, make its cut in the sections skipped during the first revolution. The teeth may be formed along as many spires of the curve as desired and the staggered relationship of the teeth will obtain throughout the length of the spiral row. The teeth 5 are formed with substantially vertical inner faces 9 and top faces 10 inclined outwardly and rearwardly from the cutting points 11, the teeth being of gradually increasing height from one end of the spiral curve to the other so that the teeth will follow through the grooves cut in a blank operated upon, each making its cut in the groove as it passes through. In cutters of the spiral type heretofore used, the successive teeth of the cutter have been in the same spire of the curve with the result that, in the operation of the cutter upon a file blank, the cutting edges of the file teeth were cut by the bottom of the angular notch at the base of the teeth. This is an objectionable feature first, because it is not possible to form a cutter of high speed steel and hold it with a uniformly sharp angle at the base of the teeth, due to the high hardening heats required, and second because the cutting edge at the base of such a notch quickly becomes dulled in operation with the result that the teeth of the files will not have as sharp an edge as desirable. With a cutter embodying the present invention, however, the cutting edges of the file teeth are formed by the inner vertical cutting edges of teeth on an outer spire of the curve and the outer inclined cutting edges of the teeth of the next inner spire which are moving through the adjacent groove on the blank. This is illustrated in Fig. 4 of the drawing in which the inner vertical face 9 of a tooth 5 on the outer spire is shown immediately in front of the outwardly inclined face 10 of the next adjacent tooth on the inner spire.

As shown in Figs. 5 and 6 the cutter when operating upon a file blank 12 is disposed with its face at a slight angle to the file blank and the file blank is positioned with its longitudinal axis intersecting the axis of the cutter, the cutter is rotated at a uniform speed and the file blank is fed longitudinally to the cutter at a uniform speed so correlated to speed of rotation of the cutter that the movement of the blank is equal to the lead of the spiral along the axis of the blank. At the edges of the blank there will be a very slight variation from the true lead of the spiral which will result in a slight widening of the grooves toward the edges but this variation is not sufficient to be objectionable and by properly correlating the size of the cutter to that of the blank, may be made so slight as not to be noticeable.

In the modification of the cutter shown in Figs. 7 to 9, the spiral cutter is in all respects similar to that above described except as to the spiral curve upon which the teeth of the cutter are generated. In this modification the spirally disposed cutter teeth are generated in a manner similar to that above described except that the generating cutter is moved at a uniform rate along a straight line other than a radial line and generates a spiral curve having its origin in a circle whose center is at the axis of the blank and which is tangent to the line along which the generating cutter moves. In view of the fact that this cutter is the same as that previously described except that the teeth are formed upon a different curve and except that the roughing cutter 4ª is formed separately and secured in the counterbore 3ª, the detailed description will not be repeated, like parts being designated in the drawing by the same reference numerals with the addition of the exponent "a." Fig. 10 shows a curve of the class generated by the above method, the curve A having its origin on the circle B and having a uniform lead along a tangent line C.

As shown in Figs. 11 and 12 the cutter last described may be employed to cut spiral teeth upon a file blank, the longitudinal axis of the blank in this case being disposed on a tangent to the circle in which the curve on which the cutter teeth are disposed has its origin and the rotation of the cutter and longitudinal movement of the blank being so correlated that the longitudinal movement of the blank is equal to the uniform lead of the curve along the axis of the blank. As shown in Figs. 11 and 12 a plurality of blanks may be operated upon at the same time by a cutter of this character, one blank being fed to the cutter along one line tangent to the circle in which the curve has its origin, and the other being fed to the cutter along a second tangent to the same circle. It may be mentioned that any number of spiral curves having an equal lead may be generated from the same circle of origin and that all such curves are parallel. The cutter may have its teeth generated upon a plurality of such parallel spiral curves as may be advantageous in cutting fine teeth upon a blank and all of the curved rows of teeth will have exactly the same lead along a line tangent to their circle of origin. Thus a somewhat better result may be obtained than in the case where a plurality of spiral rows of teeth are formed on spiral curves of other classes such as the Archimedean spirals above referred to.

Having described my invention, I claim—

1. A milling cutter having a face disposed transversely to the axis thereof which is provided with circumferentially spaced teeth all lying in the same spiral curve and arranged in staggered relation, successive teeth circumferentially of the cutter lying in different spires of the curve.

2. A milling cutter having a face disposed transversely to the axis thereof, said face having teeth thereon extending in a row throughout a plurality of adjacent spires of a spiral curve surrounding the axis of the cutter, the teeth on one spire being interposed between successive teeth on an adjacent spire.

3. A milling cutter having a face disposed transversely to the axis thereof, said face having teeth thereon lying in a spiral curve and extending through a plurality of spires thereof, said teeth being separated circumferentially by an odd number of equally spaced gashes and disposed in staggered relation with the teeth on one spire of the curve intermediate teeth on an adjacent spire.

4. A milling cutter comprising a body portion having on a face thereof an annular portion in which are formed teeth disposed in a spiral row and a roughing cutter fixed to the body portion within said annular portion.

5. A milling cutter having a face disposed transversely to the axis thereof and circumferentially spaced cutting teeth on said face arranged in a spiral curve, successive teeth being in different spires of the curve and offset radially with respect to each other, successive teeth having cutting edges which during rotation of the cutter generate surfaces of revolution which intersect intermediate the tops and bottoms of the teeth at an angle reentrant with respect to the face of the cutter.

6. A milling cutter having a face disposed transversely to the axis thereof provided with circumferentially spaced tapered teeth which have inner and outer cutting edges inclined with respect to each other, said cutting edges intersecting a spiral curve surrounding the axis of the cutter and lying in a plane parallel with the face of the cutter intermediate the tops and bottoms of the teeth, successive teeth being offset radially with respect to each other so that points of intersection of inner cutting edges with said spiral curve alternate with the points of intersection of outer cutting edges therewith.

7. A milling cutter having spaced teeth aligned circumferentially throughout a series of spires of a spiral curve surrounding the axis of the cutter, the teeth on alternate spires of the curve being aligned radially and positioned between successive circumferentially spaced teeth of the intermediate spire.

8. A milling cutter having its cutting teeth lying in a spiral curve which has a uniform lead along a line tangent to a circle which has its center at the axis of the cutter, successive teeth circumferentially of the cutter lying in different spires of the curve and offset radially with respect to each other.

9. The method of making a milling cutter which comprises forming on the face of a blank, an odd number of gashes which are equi-angularly spaced with respect to a common center to provide an odd number of raised portions around said center, and grooving alternate raised portions of the blank along a spiral curve surrounding the center of the blank to provide staggered teeth.

In testimony whereof, I hereunto affix my signature.

OLIVER G. SIMMONS.